US007559219B2

(12) United States Patent
Chen

(10) Patent No.: US 7,559,219 B2
(45) Date of Patent: Jul. 14, 2009

(54) DOOR LOCK

(76) Inventor: Jeff Chen, No. 333, Wufong N. Rd., Chiayi (TW)

( * ) Notice: Subject to any disclaimer, the term of this patent is extended or adjusted under 35 U.S.C. 154(b) by 24 days.

(21) Appl. No.: 11/819,973

(22) Filed: Jun. 29, 2007

(65) Prior Publication Data

US 2009/0000342 A1 Jan. 1, 2009

(51) Int. Cl.
*B60R 25/02* (2006.01)

(52) U.S. Cl. ......................... 70/224; 70/472; 292/336.3

(58) Field of Classification Search ................... 70/224, 70/472, 479–481; 292/336.3
See application file for complete search history.

(56) References Cited

U.S. PATENT DOCUMENTS

| | | | | |
|---|---|---|---|---|
| 5,784,909 | A * | 7/1998 | Huang | 70/224 |
| 5,809,815 | A * | 9/1998 | Lee | 70/472 |
| 5,868,018 | A * | 2/1999 | Kang | 70/472 |
| 5,934,117 | A * | 8/1999 | Shen | 70/224 |
| 5,941,108 | A * | 8/1999 | Shen | 70/467 |
| 6,041,630 | A * | 3/2000 | Shen | 70/472 |
| 6,085,561 | A * | 7/2000 | Yao | 70/472 |
| 6,216,500 | B1 * | 4/2001 | Kang | 70/224 |
| 6,223,567 | B1 * | 5/2001 | Fadul | 70/149 |
| 6,279,360 | B1 * | 8/2001 | Shen | 70/224 |
| 6,351,976 | B1 * | 3/2002 | Chen | 70/224 |
| 6,360,569 | B1 * | 3/2002 | Huang | 70/215 |
| 6,615,630 | B2 * | 9/2003 | Wu et al. | 70/472 |
| 6,807,833 | B1 * | 10/2004 | Huang et al. | 70/107 |
| 6,993,945 | B1 * | 2/2006 | Chen | 70/472 |
| 7,100,407 | B2 * | 9/2006 | Chen | 70/224 |
| 7,178,842 | B2 * | 2/2007 | Wheatland | 292/336.3 |
| 7,195,295 | B2 * | 3/2007 | Huang et al. | 292/336.3 |
| 2002/0104345 | A1 * | 8/2002 | Wang | 70/472 |
| 2004/0237608 | A1 * | 12/2004 | Chen | 70/224 |
| 2006/0021401 | A1 * | 2/2006 | Sh | 70/224 |
| 2006/0156770 | A1 * | 7/2006 | Huang et al. | 70/224 |
| 2006/0169012 | A1 * | 8/2006 | Liu et al. | 70/224 |
| 2006/0185409 | A1 * | 8/2006 | Sun et al. | 70/224 |

* cited by examiner

*Primary Examiner*—Suzanne D Barrett
(74) *Attorney, Agent, or Firm*—Bacon & Thomas, PLLC

(57) ABSTRACT

A door lock has an outside doorknob assembly having an outside doorknob and a lock core, an inside doorknob assembly having an inside doorknob and a latch button, an arresting assembly and a latch assembly. The arresting assembly has a retaining blade connecting the lock core and the latch button, a driving tube mounted rotatably around the retaining blade, a recessed arrestor slidably and non-rotatably mounted on the retaining blade and a protruding arrestor slidably mounted rotatably on the retaining blade and selectively engaging with the recessed arrestor. The latch assembly has a driving element interacting with the driving tube and a latch bolt connected to the driving element. A person can turn the latch button to rotate the retaining blade to drive the recessed arrestor to smoothly engage with or detach from the protruding arrestor to selectively lock or unlock the door lock.

4 Claims, 4 Drawing Sheets

DOOR LOCK

BACKGROUND OF THE INVENTION

1. Field of the Invention

The present invention relates to a door lock, and more particularly to a door lock that has a simplified structure and can be operated smoothly.

2. Description of the Prior Art

A conventional door lock in accordance with the prior art has an outside doorknob, an inside doorknob and a latch button. The outside doorknob is mounted on an outside of a door mounted in a doorway to a room. The inside doorknob is mounted on an inside of the door. The latch button is mounted in the inside doorknob. A person in the room can move the latch button to selectively lock or unlock the door lock.

When the latch button is in a default position, a person can turn the outside doorknob or the inside doorknob to unlock the door lock and open the door. When the latch button is in a locking position, a person outside the room is unable to turn the outside doorknob. A person in the room has to return the latch button to the default position to unlock the door lock before being able to turn the inside doorknob to open the door.

However, a child may not know the latch button must be in the default position before turning the inside doorknob to open the door. Therefore, in an emergency situation, a fire, an earthquake or the like, the child may use excessive time escaping from the room by not being able to operate the door lock.

An improved door lock in accordance with the prior art is developed to overcome the aforementioned problems of the conventional door lock. The improved door lock has an inside doorknob and a latch button. A person can turn the inside doorknob to simultaneously rotate the latch button from a locking position to a default position. So, a person can directly turn the inside doorknob to unlock the door lock and simultaneously open a door on which the improved door lock is mounted, without returning the latch button back to the default position.

However, compared to the conventional door lock, the improved door lock has more elements and is more structurally complex, preventing smooth operation and increasing costs of manufacturing.

SUMMARY OF THE INVENTION

The primary objective of the present invention is to provide a door lock to mitigate or obviate the aforementioned problems.

The door lock in accordance with the present invention has an outside doorknob assembly and an inside doorknob assembly respectively mounted on an inside and outside of a door mounted in a doorway to a room, an arresting assembly and a latch assembly.

The outside doorknob assembly has an outside doorknob and a lock core. The inside doorknob assembly has an inside doorknob and a latch button. The arresting assembly is mounted in the door and has a retaining blade connected between the lock core and the latch button, a driving tube mounted rotatably around the retaining blade, a recessed arrestor slidably and non-rotatably mounted on the retaining blade and a protruding arrestor slidably mounted rotatably on the retaining blade and selectively engaging with the recessed arrestor. The latch assembly mounted between the doorknob assemblies and has a driving element interacting with the driving tube and a latch bolt connected to the driving element.

A person can turn the latch button or the lock core to rotate the retaining blade to drive the recessed arrestor to smoothly engage with or detach from the protruding arrestor to selectively lock or unlock the door lock.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
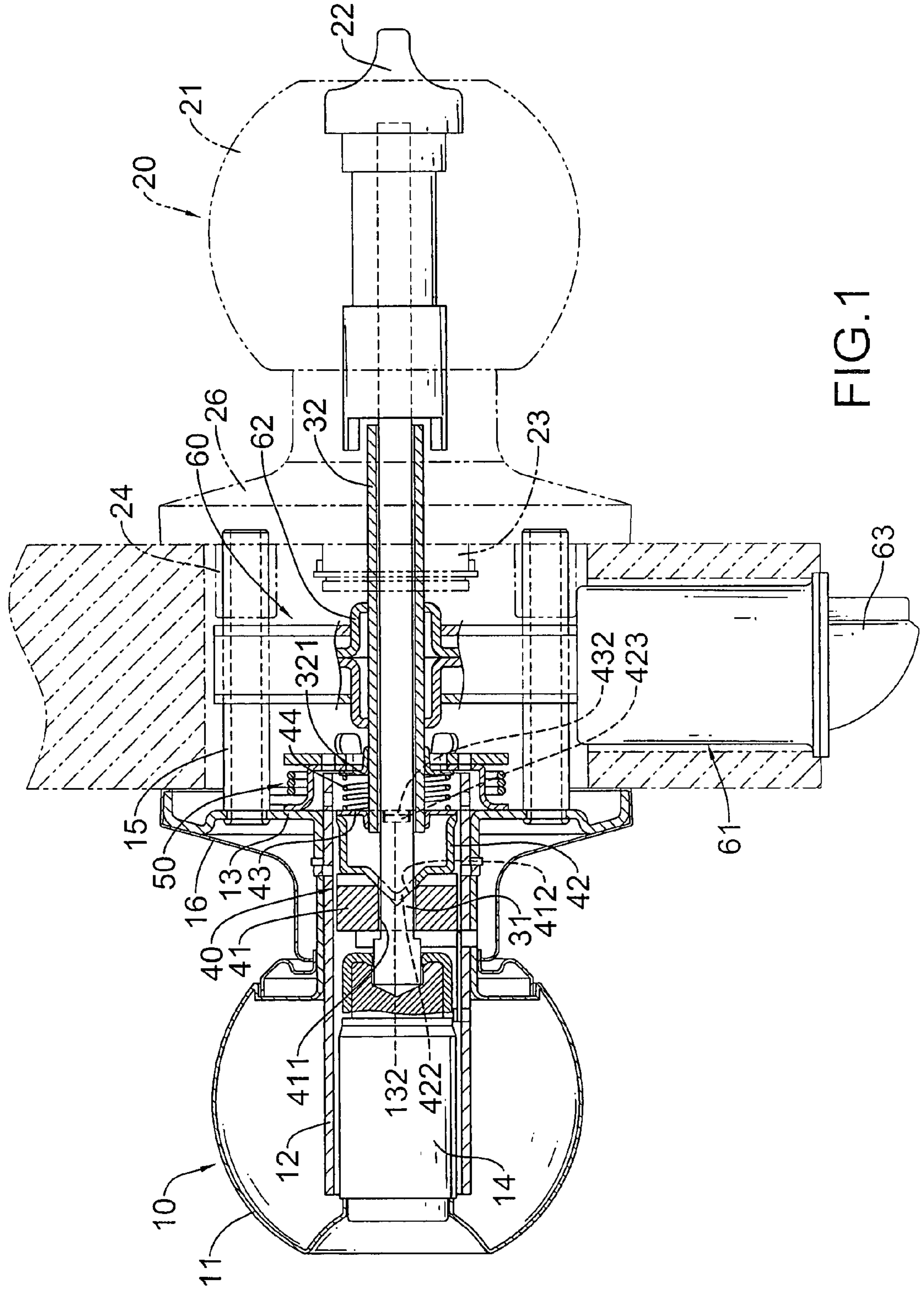
FIG. 1 is a top view in partial section of a door lock in accordance with the present invention.
Figure 2:
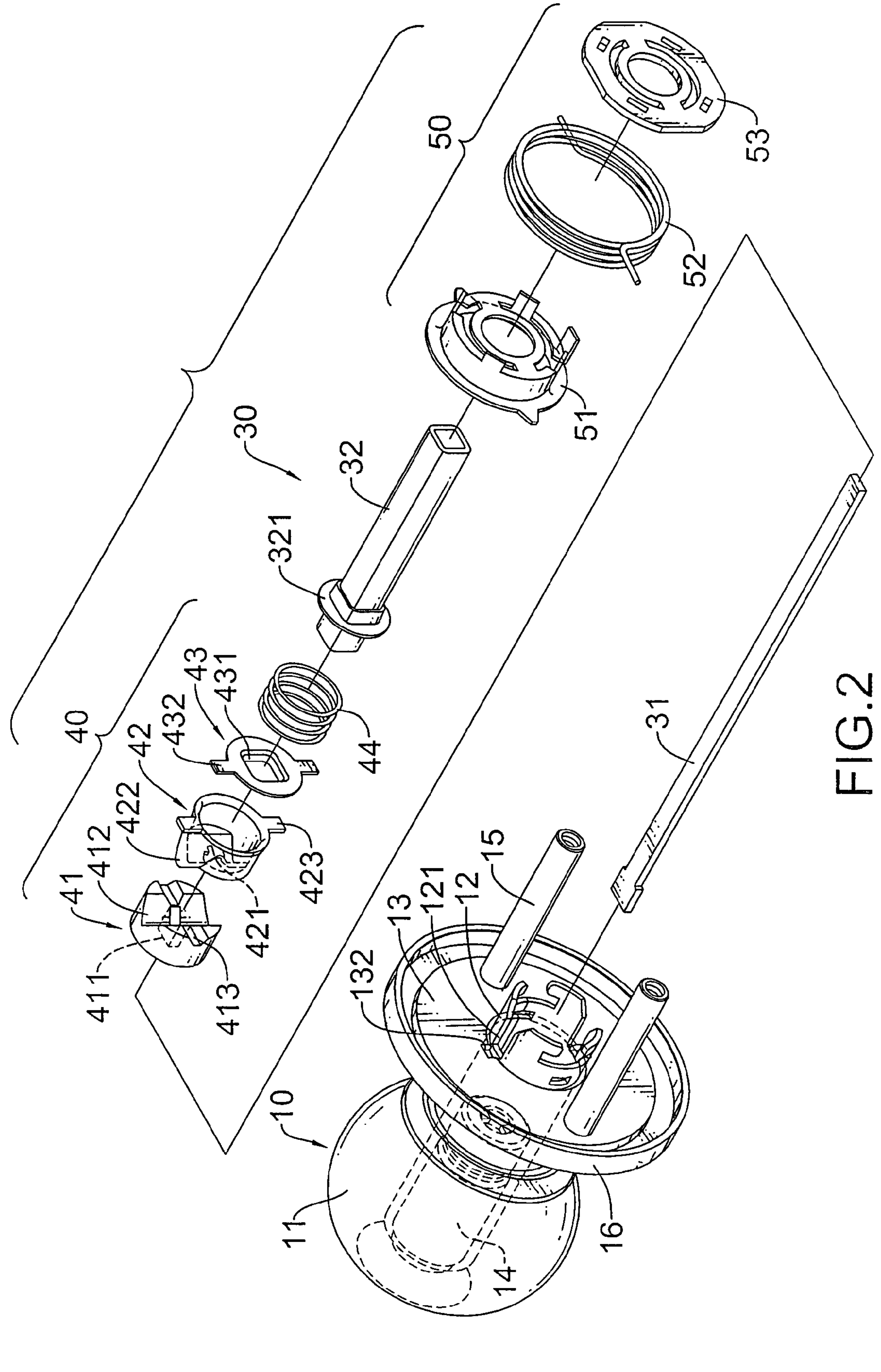
FIG. 2 is an exploded perspective view of the door lock in FIG. 1.
Figure 3:
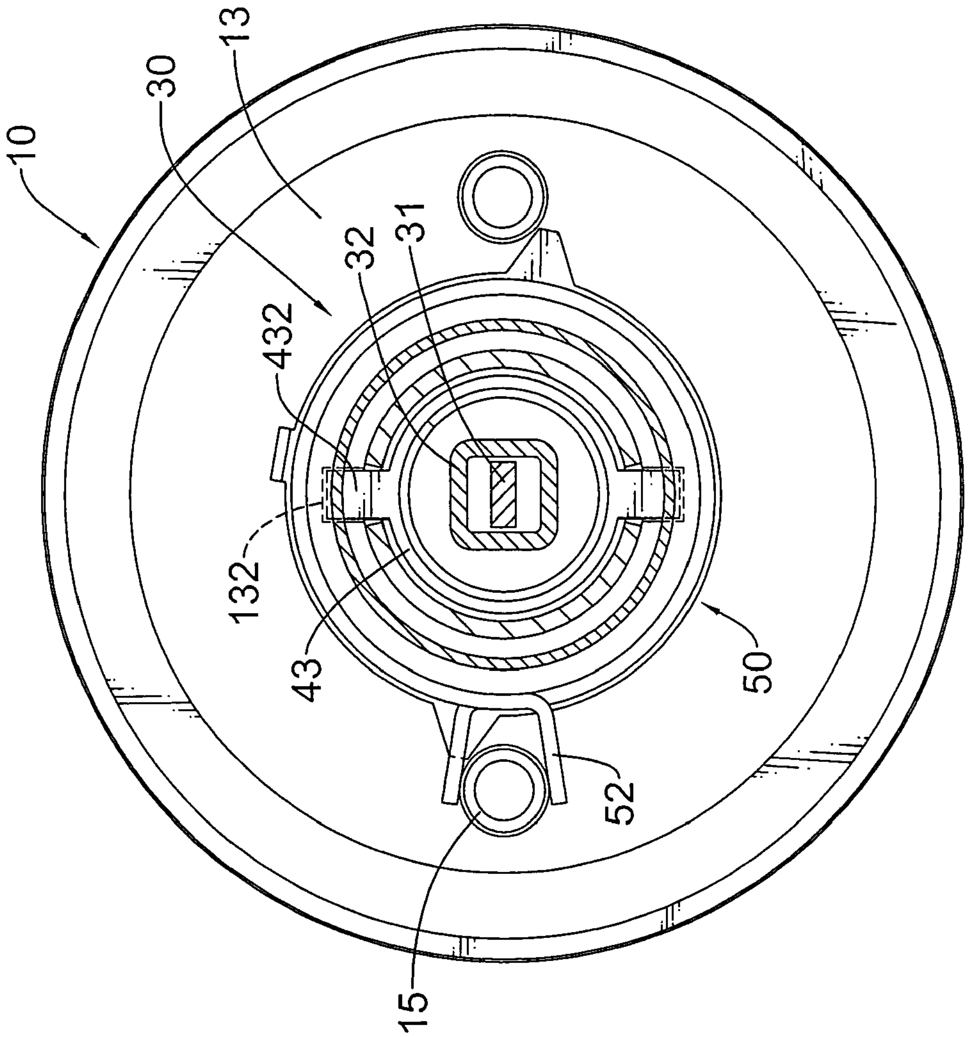
FIG. 3 is a rear view in partial section of the door lock in FIG. 1.

With referenced to FIGS. 1, 2 and 3, a door lock in accordance with the present invention is mounted on a door mounted in a doorway to a room and comprises an outside doorknob assembly (10), an inside doorknob assembly (20), an arresting assembly (30) and a latch assembly (60).

The outside doorknob assembly (10) is mounted on an outside of the door and has an outside escutcheon (16), an outside connecting tube (12), a lock core (14), an outside doorknob (11) and a faceplate (13). The outside escutcheon (16) is mounted securely on the outside of the door and has an inner face (not numbered) adjacent to the door. The outside connecting tube (12) is mounted rotatably in the outside doorknob (11) and has an inner end (not numbered) protruding into a mounting hole formed in the door, and at least one mounting slot (121) formed in the inner end of the outside connecting tube (12). The outside connecting tube (12) may have multiple mounting slots (121). The lock core (14) is mounted rotatably in the outside connecting tube (12) and allows a person outside of the room to insert a key into the lock core (14) and unlock the door lock. The outside doorknob (11) is mounted securely on the outside connecting tube (12) and rotates simultaneously with the outside connecting tube (12).

The faceplate (13) is mounted securely on the inner face of the outside escutcheon (16) and has a receiving hole (not numbered), at least one clutching recess (132) and two optional mounting rods (15). The receiving hole is formed through the faceplate (13), is mounted rotatably around the outside connecting tube (12) and has a circumferential edge (not numbered). The at least one clutching recess (132) is formed in the circumferential edge of the receiving hole and aligns with the at least one mounting slot (121) in a default position. The mounting rods (15) are formed on and protrude inward from the faceplate (13) and extend to the mounting hole in the door. The faceplate (13) may have multiple clutching recesses (132).

The inside doorknob assembly (20) is mounted on an inside of the door and has an inside escutcheon (26), an inside connecting tube (23), a latch button (22) and an inside doorknob (21). The inside escutcheon (26) is mounted securely on the inside of the door and has an inner face (not numbered) adjacent to the door and two optional mounting tubes (24). The mounting tubes (24) protrude inward from the inner face of the inside escutcheon (26), extend to the mounting hole in the door and are respectively mounted around the mounting rods (15), so that the outside escutcheon (16) and the inside escutcheon (26) can be securely mounted on the door. The inside connecting tube (23) is mounted rotatably in the inside escutcheon (26) and has an inner end (not numbered) protruding into the mounting hole in the door. The latch button (22) is mounted rotatably in the inside connecting tube (23) and allows a person in the room to move the latch button (22) to selectively lock or unlock the door lock. The inside doorknob (21) is mounted securely on the inside connecting tube (23) to rotate simultaneously with the inside connecting tube (23).

The arresting assembly (30) is mounted in the mounting hole in the door, connects the outside doorknob assembly (10) to the inside doorknob assembly (20) and has a retaining blade (31), a driving tube (32), an arresting mechanism (40) and a torsion mechanism (50). The retaining blade (31) connects the lock core (14) and the latch button (22), can be rotated by the lock core (14) or the latch button (22) to a horizontal or vertical position. The driving tube (32) is mounted rotatably around the retaining blade (31), rotates simultaneously with the outside connecting tube (12) and the inside connecting tube (23) and has a circumferential wall (not numbered) and a flange (321) formed on and protruding radially away from the circumferential wall of the driving tube (32). The driving tube (32) is rotated to lock or unlock the door lock and may be held securely in the inner end of the inside connecting tube (23) to rotate simultaneously with the inside connecting tube (32) and may be polygonal in cross-section.

The arresting mechanism (40) is mounted around the retaining blade (31) between the lock core (14) and the flange (321) and has a recessed arrestor (41), a protruding arrestor (42), a limiting spacer (43) and an arrestor spring (44).

The recessed arrestor (41) has an inner end (not numbered), a limiting hole (411), a receiving notch (412) and an optional positioning notch (413). The limiting hole (411) is formed axially through the recessed arrestor (41) and is mounted slidably and non-rotatably around the retaining blade (31) to simultaneously rotate with the retaining blade (31). The receiving notch (412) is V-shaped and formed in the inner end of the recessed arrestor (41). The positioning notch (413) is V-shaped, is formed in the inner end of the recessed arrestor (41), intersecting and being smaller than the receiving notch (412).

The protruding arrestor (42) has an outer end (not numbered), a circumferential wall (not numbered), a through hole (421), a positioning protrusion (422) and at least one arrestor lug (423). The through hole (421) is formed axially through the protruding arrestor (42) and is mounted slidably and rotatably around the retaining blade (31). The positioning protrusion (422) is formed on and protrudes from the outer end of the protruding arrestor (42) and selectively engages the receiving notch (412) and the positioning notch (413) in the recessed arrestor (41). The at least one arrestor lug (423) is formed on and protrudes from the circumferential wall of the protruding arrestor (42) and is mounted slidably in the mounting slot (121) of the outside connecting tube (12) to rotate simultaneously with the outside connecting tube (12). The protruding arrestor (42) may have multiple arrestor lugs (423).

The limiting spacer (43) is mounted between the protruding arrestor (42) and the flange (321) and has a periphery (not numbered), a limiting hole (431) and at least one limit lug (432). The limiting hole (431) is formed axially through the limiting spacer (43), is mounted slidably and non-rotatably around the driving tube (32) and may correspond to the polygonal cross-section of the driving tube (32). The at least one limit lug (432) is formed on and protrudes from the periphery of the limiting spacer (43) and is mounted slidably in the at least one mounting slot (121) in the outside connecting tube (12) to rotate simultaneously with the outside connecting tube (12). Therefore, the driving tube (32) held securely in the limiting spacer (43) rotates simultaneously with the outside driving tube (12). The limiting spacer (43) may have multiple limit lugs (432). The arrestor spring (44) is mounted between the limiting spacer (43) and the flange (321).

When the retaining blade (31) is turned to the horizontal position, the receiving notch (412) in the recessed arrestor (41) aligns with the positioning protrusion (422) on the protruding arrestor (42), allowing the protruding arrestor (42) to be mounted flushly in the recessed arrestor (41) causing the limiting spacer (43) and the protruding arrestor (41) to be pressed outward by the arrestor spring (44). Therefore, the at least one arrestor lug (423) and the at least one limit lug (432) slide into and are respectively held in the at least one clutching recess (132) in the faceplate (13). Accordingly, a person outside of the room is unable to turn the outside doorknob (11) preventing them from opening the door. When the at least one arrestor lug (423) and the at least one limit lug (432) is held in the clutching recess (132), a person in the room is still able to turn the inside doorknob (21) to simultaneously rotate the inside connecting tube (23) and the latch button (22) to detach the at least one arrestor lug (423) and the at least one limit lug (432) from the clutching recess (132) and to rotate the driving tube (32) to unlock the door.

Figure 4:
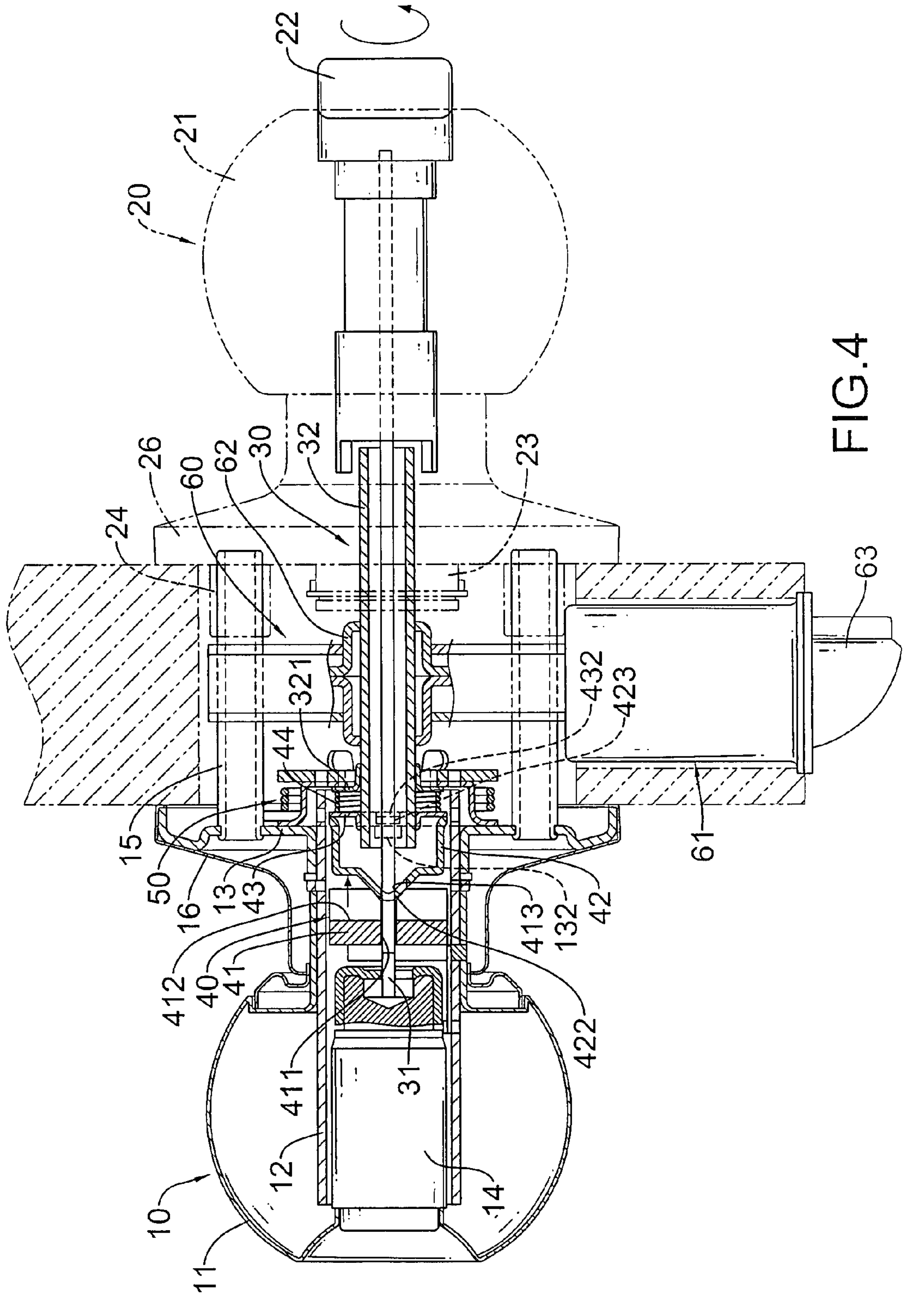
FIG. 4 is an operational top view in partial section of the door lock in FIG. 1 with a retaining blade of the door lock being turned to a vertical position.

With further referenced to FIG. 4, when the retaining blade (31) is in a vertical position, the receiving notch (412) in the recessed arrestor (41) is no longer positioned to align and engage with the positioning protrusion (422) but may be aligned with the positioning notch (413). Therefore, the protruding arrestor (42) is forced away from the inner end of the recessed arrestor (41) and the arrestor spring (44) is compressed, meaning the arrestor lug (423) and limit lug (432) are held outside of the clutching recess (132). Accordingly, the driving tube (32) is released, and a person can rotate the outside doorknob (11) or the inside doorknob (21) to drive the driving tube (32) to unlock the door lock.

The torsion mechanism (50) has an optional spring bracket (51), a torsion spring (52) and an optional base panel (53). The spring bracket (51) is mounted securely on the inner end of the outside connecting tube (12) and has a through hole (not numbered) formed through the spring bracket (51) and mounted rotatably around the driving tube (32). The torsion spring (52) is mounted around the driving tube (32), provides a repositioning torsion for the outside connecting tube (12) and may be mounted on the spring bracket (51) and have a proximal end (not numbered) abutting the spring bracket (51) and a distal end (not numbered) may abut one of the mounting rods (15) to provide the repositioning torsion for the outside connecting tube (12). The base panel (53) is mounted on the spring bracket (51) and has a through hole (not numbered) mounted rotatably around the driving tube (32).

The latch assembly (60) is mounted in the mounting hole in the door between the outside doorknob assembly (10) and the inside doorknob assembly (20) and has a driving element (62) and a latch bolt (63). The driving element (62) interacts with the driving tube (32). The latch bolt (63) is mounted retractably in the mounting hole in the door and is connected to the driving element (62).

When the outside connecting tube (12) and the inside connecting tube (23) are in default position, the latch bolt (63) inserts into a latch bolt hole formed in a wall opposite to a wall on which the door is pivotally mounted. When the outside connecting tube (12) or the inside connecting tube (23) is turned, the driving tube (32) is rotated to drive the driving element (62) to retract the latch bolt (63) from the latch bolt hole to unlock the door lock.

A person can turn the latch button (22) to rotate the retaining blade (31) to a horizontal position, the at least one arrestor lug (423) and the at least one limit lug (432) are held in the clutching recess (132) to prevent the driving tube (32) from being rotated from the outside, so that the latch bolt (63) cannot be retracted and the door lock is locked.

Nevertheless, a person in the room is still able to turn the inside doorknob (21) to simultaneously rotate the latch button (22) and the inside connecting tube (23) to rotate the driving tube (32) to drive the driving element (62) to retract the latch bolt (63) from the latch bolt hole to unlock the door, without firstly turning the latch button (22) back to default position. Thus, in an emergency situation, such as a fire, an earthquake or the like, people can escape from the room quickly since they do not need to doorknob (21) to unlock the door lock and open the door in time.

With the V-shaped receiving notch (412), V-shaped positioning notch (413) and the V-shaped positioning protrusion (422), the protruding arrestor (42) can be smoothly received in or pushed out of the recessed arrestor (41), such that the door lock can be locked or unlocked smoothly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A door lock comprising
an outside doorknob assembly having
an outside escutcheon having an inner face;
an outside connecting tube being mounted rotatably in the outside doorknob and having
an inner end; and
at least one mounting slot being formed in the inner end of the outside connecting tube;
a lock core being mounted rotatably in the outside connecting tube;
an outside doorknob being mounted securely on the outside connecting tube; and
a faceplate being mounted securely on the inner face of the outside escutcheon and having
a receiving hole being formed through the faceplate, mounted rotatably around the outside connecting tube and having a circumferential edge; and
at least one clutching recess formed in the circumferential edge of the receiving hole and aligning with the at least one mounting slot in a default position;
an inside doorknob assembly having
an inside escutcheon having an inner face;
an inside connecting tube being mounted rotatably in the inside escutcheon and having an inner end;
a latch button being mounted rotatably in the inside connecting tube; and
an inside doorknob being mounted securely on the inside connecting tube;
an arresting assembly connecting the outside doorknob assembly and the inside doorknob assembly and having
a retaining blade connecting the lock core and the latch button;
a driving tube being mounted rotatably around the retaining blade, rotating simultaneously with the outside connecting tube and the inside connecting tube and having
a circumferential wall; and
a flange formed on and protruding radially away from the circumferential wall of the driving tube;
an arresting mechanism; and
a torsion mechanism having
a torsion spring being mounted around the driving tube and providing a repositioning torsion for the outside connecting tube; and
a latch assembly being mounted between the outside doorknob assembly and the inside doorknob assembly and having
a driving element interacting with the driving tube; and
a latch bolt being connected to the driving element,
wherein the arresting mechanism is mounted around the retaining blade between the lock core and the flange and has
a recessed arrestor having
an inner end;
a limiting hole being formed axially through the recessed arrestor and being mounted slidably and non-rotatably around the retaining blade; and
a receiving notch being V-shaped, formed in the inner end of the recessed arrestor; and
a protruding arrestor having
an outer end;
a circumferential wall;
a through hole being formed axially through the protruding arrestor and being mounted slidably and rotatably around the retaining blade;
a positioning protrusion being formed on and protruding from the outer end of the protruding arrestor and selectively engaging the receiving notch of the recessed arrestor; and
at least one arrestor lug being formed on and protruding from the circumferential wall of the protruding arrestor and mounted slidably in the mounting slot of the outside connecting tube;
a limiting spacer being mounted between the protruding arrestor and the flange and having
a periphery;
a limiting hole being formed axially through the limiting spacer and mounted slidably and non-rotatably around the driving tube; and
at least one limit lug being formed on and protruding from the periphery of the limiting spacer and being mounted slidably in the at least one mounting slot in the outside connecting tube; and
an arrestor spring mounted between the limiting spacer and the flange,
wherein the recessed arrestor further has a positioning notch being V-shaped, the positioning notch being formed in the inner end of the recessed arrestor, the positioning notch being smaller than the receiving notch, and the positioning notch intersecting the receiving notch, and
wherein the positioning protrusion on the protruding arrestor selectively engages with the positioning notch in the recessed arrestor.

2. The door lock as claimed in claim 1, wherein
the outside connecting tube has multiple mounting slots;
the faceplate has multiple clutching recesses;

the protruding arrestor has multiple arrestor lugs; and the limiting spacer has multiple limit lugs.

3. The door lock as claimed in claim 1, wherein the faceplate further has two mounting rods formed on and protruding inward from the faceplate; and the inside escutcheon has two mounting tubes protruding inward from the inner face of the inside escutcheon and are respectively mounted around the mounting rods.

4. The door lock as claimed in claim 3, wherein the torsion mechanism further has a spring bracket being mounted securely on the inner end of the outside connecting tube and having a through hole formed in the spring bracket and mounted rotatably around the driving tube;

a base panel being mounted on the spring bracket and having a through hole formed therein and mounted rotatably around the driving tube; and the torsion spring is mounted on the spring bracket and having a proximal end abutting the spring bracket and a distal end abutting one of the mounting rods.

* * * * *